Oct. 19, 1971     H. K. KELLY ET AL     3,613,485
METHOD OF FABRICATING A CUTTER
Original Filed Aug. 1, 1967     4 Sheets-Sheet 1
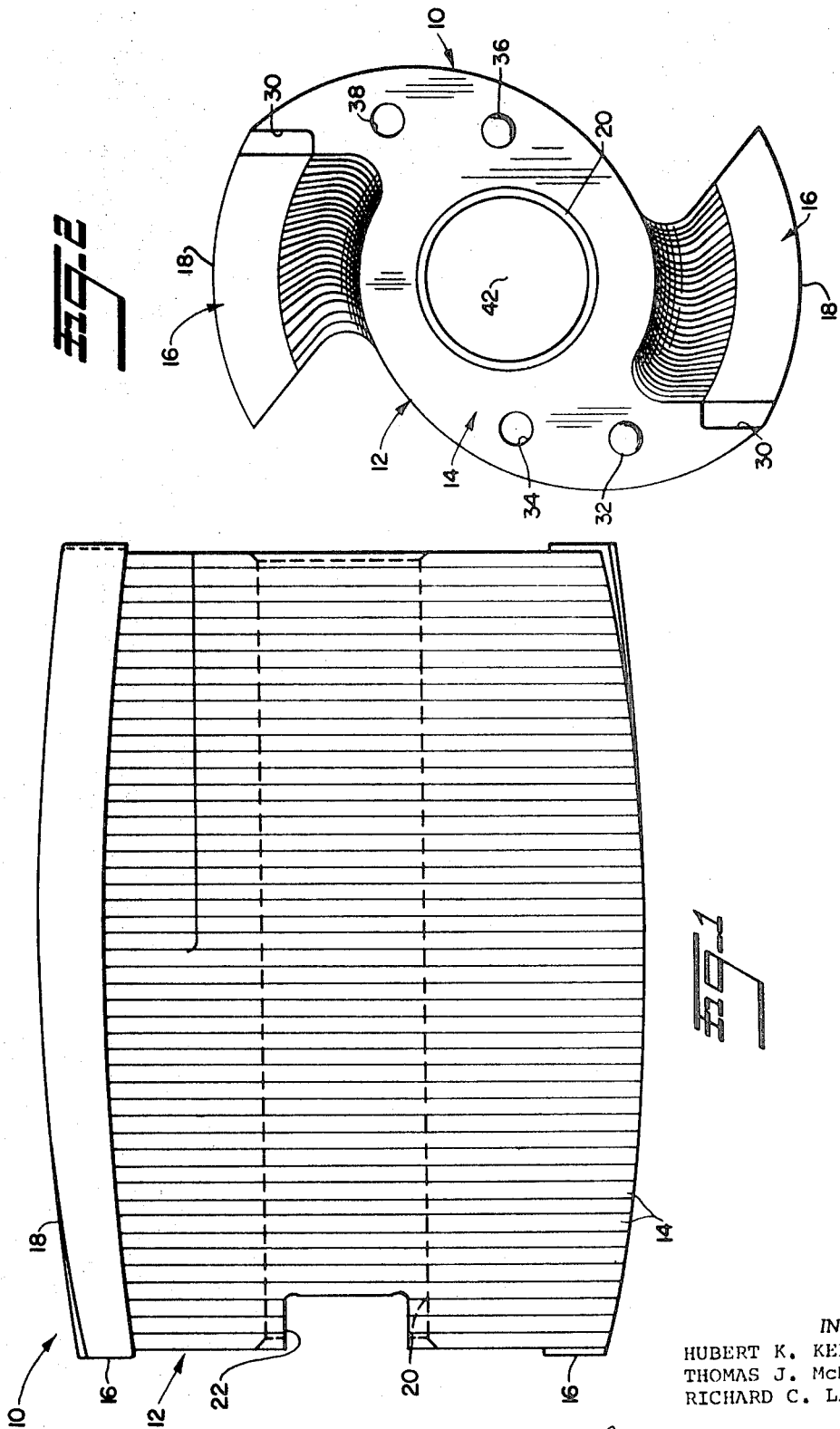
INVENTORS
HUBERT K. KELLY
THOMAS J. McDONNELL
RICHARD C. LAMKIN
BY *Strauch, Nolan, Neale, Nies & Kurz*
ATTORNEYS Oct. 19, 1971  H. K. KELLY ET AL  3,613,485
METHOD OF FABRICATING A CUTTER
Original Filed Aug. 1, 1967  4 Sheets-Sheet 2
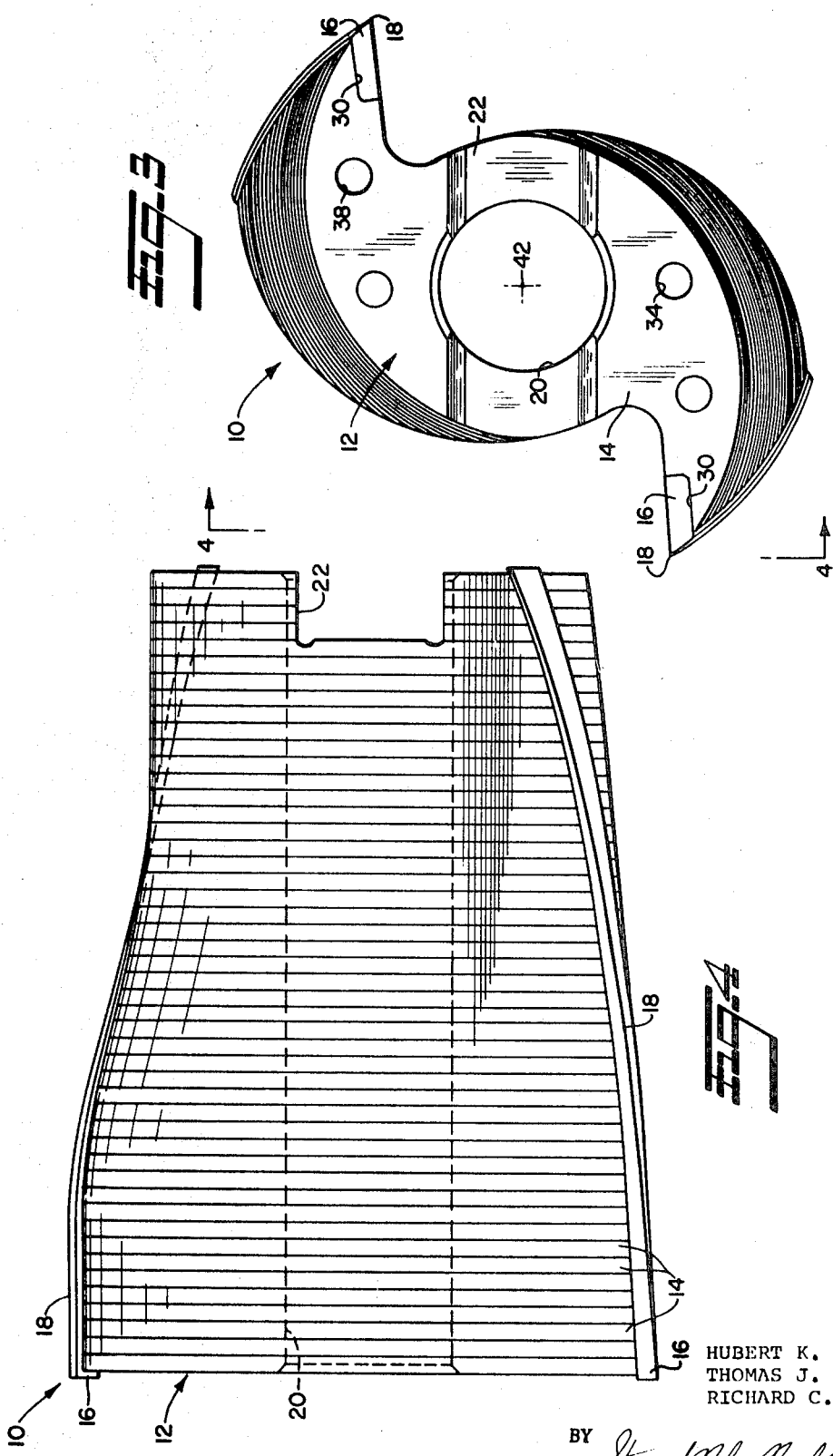
INVENTORS
HUBERT K. KELLY
THOMAS J. McDONNELL
RICHARD C. LAMKIN
BY Strauch, Nolan, Neale, Nies & Kurz
ATTORNEYS

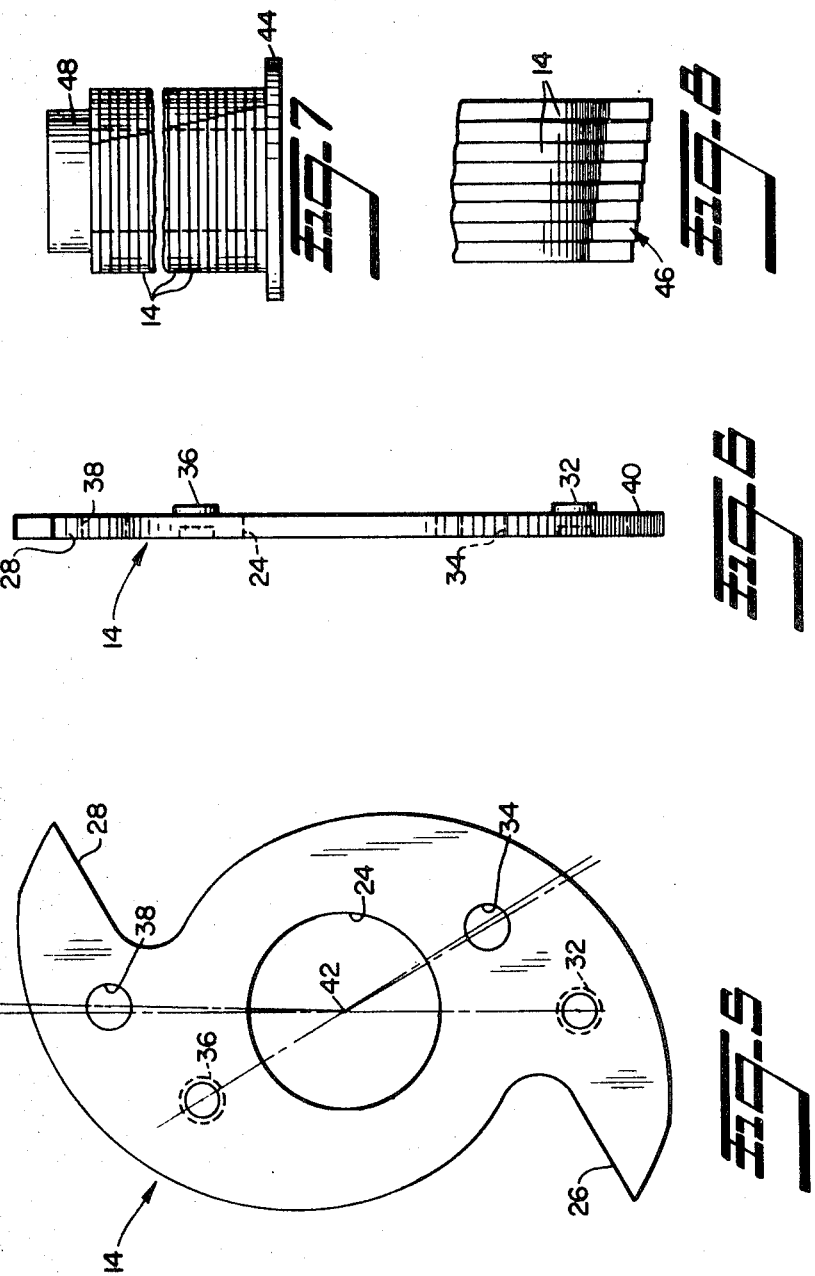

Oct. 19, 1971  H. K. KELLY ET AL  3,613,485
METHOD OF FABRICATING A CUTTER
Original Filed Aug. 1, 1967  4 Sheets-Sheet 4
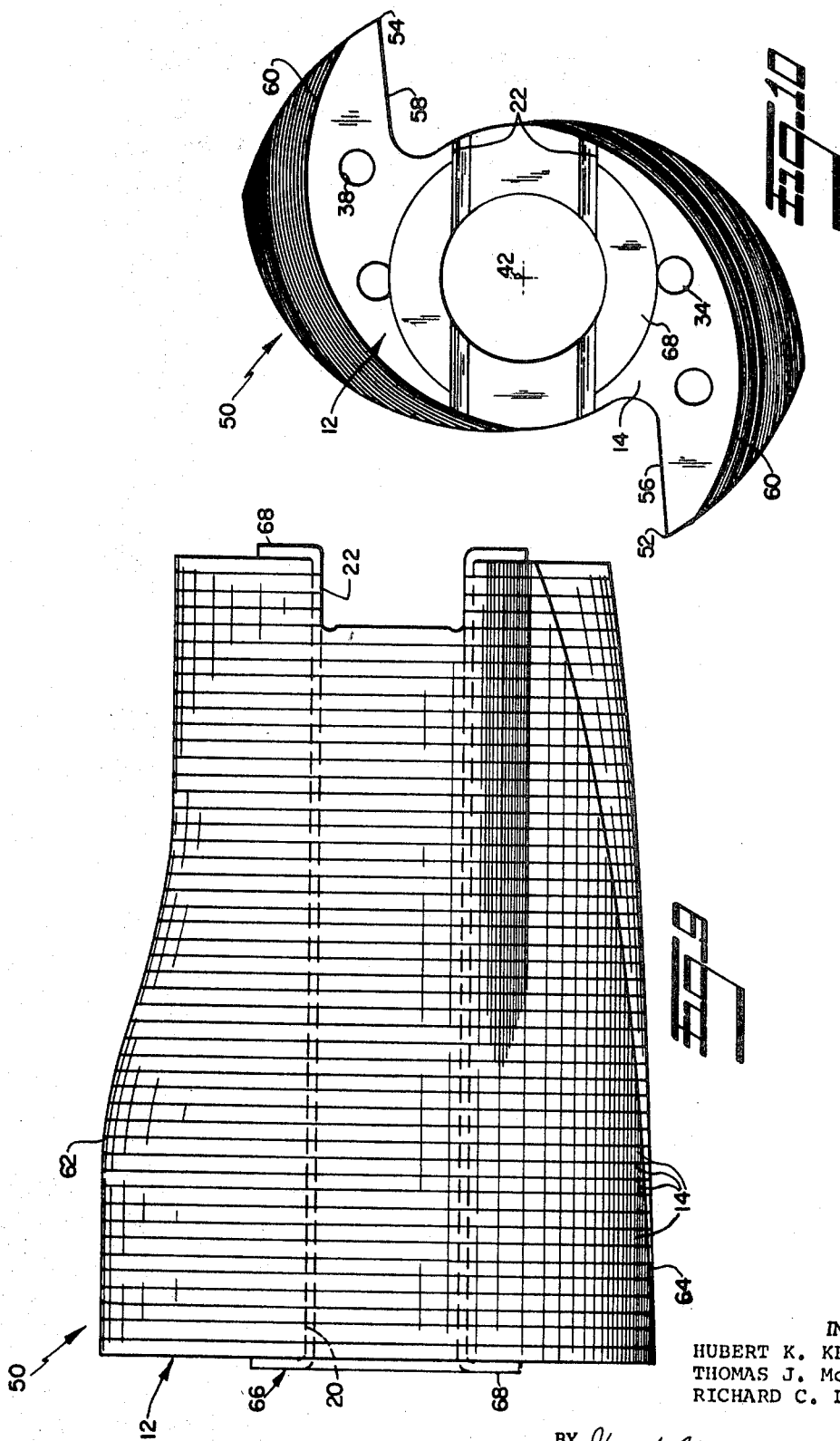
INVENTORS
HUBERT K. KELLY
THOMAS J. McDONNELL
RICHARD C. LAMKIN
BY *Strauch, Nolan, Neale, Nies & Kurz*
ATTORNEYS United States Patent Office 3,613,485
Patented Oct. 19, 1971

3,613,485
METHOD OF FABRICATING A CUTTTER
Hubert K. Kelly, Clay, Thomas J. McDonnell, Syracuse, and Richard C. Lamkin, Skaneateles, N.Y., assignors to Rockwell Manufacturing Company, Pittsburgh, Pa.
Original application Aug. 1, 1967, Ser. No. 657,647, now Patent No. 3,491,422, dated Jan. 27, 1970. Divided and this application Aug. 12, 1969, Ser. No. 862,574
Int. Cl. B21k 21/00
U.S. Cl. 76—101 A                                   4 Claims

ABSTRACT OF THE DISCLOSURE

A cutter head including a laminate of platelike elements joined into a unitary structure. The elements define a continuous cutting edge extending the length of the cutter or a similarly dimensioned seat for a separate cutting edge member. An element locating and positioning arrangement angularly indexes each element relative to the element or elements thereadjacent to provide a cutting edge or seat of specified configuration.

RELATED APPLICATION

This application is a division of our copending application Ser. No. 657,647 filed Aug. 1, 1967, now Pat. No. 3,491,422 issued Jan. 27, 1970.

BACKGROUND AND SUMMARY OF THE INVENTION

This invention relates to cutters and, more particularly, to rotary cutters for power-operated tools such as planes and the like.

The principles of the present invention may be employed to particular advantage in the manufacture of spiral or helical cutters in which the cutting edges describe a helix on other specified curve. They will accordingly be developed by relating them to this particular application. However, the foregoing is by no means the only application of the principles of the invention which may equally well be employed in the manufacture of cutters with straight cutting edges, for example. The ensuing description of a particular application of the invention is therefore to be understood as only illustrative and not definitive of the scope of the invention, which is intended to be limited only as set forth in the appended claims.

At the present time helical cutters for power-operated planes and other tools are most commonly made by machining them from bars or blanks of high speed tool steel or similar material. This method is satisfactory for very small cutters. However, it becomes increasingly and almost prohibitively expensive as the size of the cutter increases due to the amount and complexity of the machining involved. For example, one three inch cutter of this type for a portable, power-operated plane carries a retail price of almost fifty dollars.

I have now discovered a novel technique for manufacturing cutters of the type just described at a fraction of the present cost. This is done by fabricating the body of the cutter from a number of identical, sheet-like elements which define one or more continuous cutting edges extending the length of the cutter or one or more similarly dimensioned seats for a separate tip on which the cutting edge is formed. These elements may be stamped from sheet material of an appropriate thickness.

The elements are assembled in a laminate or stack slightly greater in length than the completed cutter. With the aid of a novel locating arrangement consisting of cooperating bosses and apertures with which the cutter elements are provided when they are stamped, each element is angularly indexed relative to the preceding element in the stack. The indexing of the cutter elements so displaces the adjacent elements that they define the helical or other specified path selected for the cutting edge or edges of the cutter or for the cutter tip seat or seats.

Then, the assembled stack of cutter elements is assembled into a unitary structure as by bonding or mechanically connecting them together. Thereafter, the cutter edge defining portion or portions of the cutter body are treated to form the cutting edge or edges. Alternatively, a seat may be machined in the cutter body and a separate cutter tip mounted in the seat.

One important advantage of the invention just described is the reduction in the cost of producing spiral and other cutters it provides. This is because of the elimination of virtually all machining and because the cutter body is fabricated of identical inexpensive elements.

Further reductions in manufacturing costs result from the novel cutter element indexing and locating arrangement described above. Specifically, this arrangement makes it virtually impossible to misassemble the cutter elements. This reduces both the caliber of the labor required on the production line and the percentage of defective cutters produced in the manufacturing process.

Another advantage of the present invention is the versatility it affords. For example, the cutters of the present invention can be provided with both left- and right-hand curves of varying configuration and can easily be provided with carbide or other cutter tips to increase their effectiveness and useful life.

Various types of segmented cutters have heretofore been proposed such as those described in U.S. Pats. Nos. 21,782 to Sperry; 1,571,559 to Smith, 2,431,581 to Owen; 3,157,938 to Sabberwal; and 3,237,275 to Middleton. None of the cutters disclosed in these patents have the advantage of those of the present invention, however. This is because they do not incorporate the novel and important features of the present invention discussed above such as the cutter element indexing arrangement or the use of a bonding material or simple mechanical connector to join the cutter elements into an integral body structure, for example.

Moreover, the constructions shown in these patents are limited to cutters which are only useful for specific limited purposes. For example, the Middleton arrangement cannot be used if the cutter is to have a continuous cutting edge extending from end-to-end of the cutter. The Sperry, Smith, and Owen constructions cannot be used if the cutter tip is to have a helical or other curved cutting edge.

Further, some of these prior art constructions require so many components or components of such complex configuration that they would be even more expensive to manufacture than the conventional one-piece machined cutters. Among the arrangements falling in this category are those described in the Sabberwal and Middleton patents.

From the foregoing it will be apparent that important and primary objects of the present invention reside in the provision of novel, improved rotary cutters for power-operated tools and in the provision of novel, improved methods of manufacturing such cutters.

Another important and related object of the present invention is the provision of cutters which, in comparison to those heretofore available, are substantially less expensive to manufacture and are capable of materially reducing cutter replacement costs.

A further related and also important object of the present invention is the provision of methods of manufacturing rotary cutters that can be used to produce cutters having a variety of configurations and characteristics and which are accordingly substantially more versatile than heretofore known methods of manufacturing such cutters.

Another important but more specific object of this invention resides in the provision of novel, improved methods of manufacturing rotary cutters which are particularly adapted to the production of cutters having helical or other curved cutting edges and to the provision of novel, improved cutters of this type.

Other important objects, additional features, and further advantages of the present invention will become apparent from the appended claims and as the ensuing detailed description and discussion proceeds in conjunction with the accompanying drawing.

BRIEF DESCRIPTION OF THE DRAWING

In the drawing:

FIG. 1 is a plan view of a rotary cutter embodying and constructed in accord with the principles of the present invention;

FIG. 2 is a right-hand end view of the cutter of FIG. 1;

FIG. 3 is a left-hand end view of the cutter of FIG. 1;

FIG. 4 is a view of the cutter looking in the direction of arrows 4—4 in FIG. 3;

FIG. 5 is a side view of a platelike cutter element employed in the cutter of FIG. 1;

FIG. 6 is an edge view of the cutter element;

FIG. 7 is a generally schematic view of the assembled cutter elements;

FIG. 8 is a fragmentary view of the cutter body, showing one of the two surface portions of the body in which the seats for the cutter tips may be machined;

FIG. 9 is a side view of a second form of cutter constructed in accord with the principles of the present invention; and FIG. 10 is an end view of the cutter of FIG. 9.

DETAILED DESCRIPTION OF PREFERRED EMBODIMENTS

Referring now to the drawing, FIGS. 1-4 illustrate a helical cutter 10 constructed in accord with and embodying the principles of the present invention. Cutter 10 consists of a body 12, which is a laminate of identical, sheetlike elements 14, and two tips 16, which provide cutting edges 18. A central bore 20 through cutter body 12 accommodates the cutter shaft (not shown) of the power-operated tool for which the cutter is intended. A slot or notch 22 machined in one end of the cutter body (see FIGS. 3 and 4) is intended to engage a similarly configured lug on the cutter shaft to drive connect the cutter to the shaft.

Turning next to FIGS. 5 and 6, each of the elements 14 from which cutter body 12 is fabricated has a central aperture 24 and two oppositely located, cutting tip supporting edges 26 and 28. The central apertures 24 of the assembled elements form the bore 20 for the cutter shaft, and the juxtaposed edges of the elements provide two elongated peripheral cutter portions in which seats 30 for the two cutter tips 16 are formed.

Cutter elements 14 also include cooperating bosses and apertures 32, 38 and 36, 34 for locating each element 14 of cutter body 12 in a specific angularly indexed relationship relative to the preceding element. Bosses 32 and 36 both protrude from the same face 40 of the element, and the cooperating boss-aperture pairs 32, 38 and 36, 34 are located on opposite sides of the center 42 of the element with the bosses and apertures facing and with boss 32 and the oppositely located aperture 38 the same distance from center 42. Aperture 34 and boss 36 are also equidistantly spaced from center 42, but are at a different distance from the center than boss 32 and aperture 38.

The angle between each boss and the oppositely located apertures differs from 180° by the angle which each element 14 is to be indexed relative to the preceding angle. This angle, which will hereinafter be referred to as the index angle, will typically be on the order of 1°5', and the angle between the bosses and the apertures thereadjacent will typically be on the order of 30°.

Cutter elements 14 may be formed, complete with central apertures 24, bosses 32 and 36, and apertures 34 and 38, by stamping them from a suitable material such as $\frac{1}{16}$ inch cold rolled sheet steel. The elements thus formed are then joined into a unitary structure. In one method of doing this the elements are coated with a material having good bonding properties and a melting point which is substantially lower than that of the material from which the elements are fabricated. Typically, this coating will be copper plated on the element to a thickness of .0001/ .0002 inch.

The plated cutter elements are stacked or assembled on a base or support 44 as shown in FIG. 7 (if desired, a mandrel (not shown) may be utilized to align the elements as they are stacked. However, if the arrangement of bosses and apertures described above is employed, the mandrel will normally be unnecessary since the two boss-aperture pairs are capable of providing the necessary alignment). Each element added to this stack is rotated approximately a half revolution with respect to the preceding element as it is added. That is, each element is so added to the stack that its seat defining edge 26 is adjacent the preceding element's seat defining edge 28 and vice versa.

The specific angle which each element will be rotated relative to the preceding element will differ from 180° by the angle of index. With this specific angular displacement effected, the bosses 32 and 36 of one of the juxtaposed elements will fit into the apertures 34 and 38 of the other element. As is perhaps best shown in FIG. 2, this will result in each element 14 being displaced by the specified angle of index relative to the preceding element.

This provides two seat defining edge portions 46 (one of which is shown in FIG. 8) having generally the same configuration as the spiral cutting tips 16. Thus, the locating arrangement consisting of bosses 32 and 36 and apertures 34 and 38 is an important practical feature since it automatically displaces and locates each element 14 relative to the preceding element as the elements are assembled to form the two seat defining edge portions 46.

Another important feature of this locating arrangement is that it precludes misassembly of elements 14. This is because bosses 32 and 36 of one element will not fit into apertures 34 and 38 of the other unless each element is angularly displaced relative to the preceding element in the manner just described.

By varying the relationship of the apertures and bosses both right- and left-hand helixes and curves of other configurations can be obtained. This versatility is an important feature of the present invention.

The number of cutter elements just assembled will depend upon the length which the finished cutter is to have. For example, in manufacturing one typical three inch cutter according to the present invention, forty-eight elements fabricated from $\frac{1}{16}$ inch sheet material are employed.

After the required number of cutters have been assembled, a weight 48 is added; and the assembly is placed in a furnace to melt the bonding material with which the elements are coated and thereby bond them together.[1]

The unitary cutter body 12 thus formed is then finished by grinding off the bosses 32 and 36 which will protrude from one end of the body, by milling or otherwise machining seats 30 in seat defining edges 46, and by machining drive slot 22 in one end of the cutter. One-piece spiral cutter tips 16, which are slightly longer than the cutter body and have continuous cutting edges, are then disposed in seats 30 and fixed to the cutter body as by silver soldering. Silver solder is preferably ---
[1] Other methods of bonding the cutter elements together can of course be employed. For example, there are commercially available adhesives which have sufficient strength for this purpose.

employed since it has a low melting point, and a material having this characteristic is of course necessary to prevent the bonding material between cutter elements 14 from being melted when the cutting tips are attached.

The cutter is then statically balanced, completing the typical manufacturing process.

It will be apparent from the foregoing that another advantage of the cutter just described is that cutter tips 16 may be of any desired material in contrast to conventional one-piece cutters in which the tips and bodies are not only of the same material but must be of a material which can be readily machined to produce the desired spiral or helical configuration. For example, carbide tips can readily be employed in the type of cutter just described, if desired, to take advantage of the long-wearing and cutting properties of such materials.

An important and related advantage is that wearing of or damage to the cutter tips does not require scrapping of the cutter. When this occurs, cutter tips 16 may be readily removed by melting the silver solder with which they are attached, and replaced.

Another important advantage of the cutter just described, as will also be apparent from the foregoing, is that only a minimum of machining operations are required; viz., those necessary to form drive slot 22 and cutter tip seats 30. Moreover, these few operations are of an extremely simple character. Accordingly, cutters of the type described above can be manufactured much less expensively than those of conventional one-piece construction in which a considerable quantity of complex machining is required.

Numerous modifications may be made in the exemplary cutter and method of cutter assembly discussed above without exceeding the present invention. A cutter 50 illustrating typical modifications is shown in FIGS. 9 and 10.

Turning now to the foregoing figures, it is not necessary that the cutters of the present invention have separate cutter tips as indicated above. In cutter 50 each cutter element 14 has two cutting edges 52 and 54 located at the intersections of the radially extending edges 56 and 58 of the cutter with its periphery 60. As shown in FIG. 9, the edges 52 and 54 of the individual cutter elements cooperate to define two continuous cutting edges 62 and 64 extending the length of the cutter. If desired, these cutting edges may be subjected to a conventional hardening or other treatment after the cutter elements have been assembled to make them more wear resistant or otherwise enhance cutting ability and/or service life of the cutter.

Also, it is not necessary that cutter elements 14 be bonded to each other to join them into an integral unit. This may be done by using one or more connecting members such as dowels or the tube or sleeve 66 illustrated in FIGS. 9 and 10.

In this version of the invention, one (or both) of the ends 68 of sleeve 66 are flared out after the cutter elements have been assembled on it to join the elements into a unitary structure.

From the foregoing it will be apparent that versions of the present invention are contemplated in which the boss-aperture arrangement described above need only index the cutter elements relative to each other, the locating of the elements relative to each other otherwise being performed by other elements of the cutter. A typical cutter of this type is that shown in FIGS. 9 and 10 in which sleeve 66 performs all of the locating functions except for that of angularly indexing the cutter elements relative to each other.

In embodiments of the type just described, it is not essential that two sets of cooperating apertures and bosses be employed. Instead, a single set 32, 38 of bosses and apertures can be relied upon to angularly index the elements relative to each other with sleeve 66 being employed to otherwise position the elements relative to each other.

Similarly, in the cutter embodiment illustrated in FIGS. 1 and 2, both bosses 32 and 36 are located on the same side of the cutter element 14 as are both apertures 34 and 38. This is not essential, and the bosses and apertures can be located so that there is one aperture in and one boss protruding from each face of the cutter element.

Furthermore, it will be apparent that the bosses and apertures need not be in the specific locations illustrated in FIGS. 1 and 2 or 9 and 10. Instead these elements may be in any appropriate location. For example, they may be at the periphery of the cutter element in which case the apertures could be formed as notches in the edges of the cutter elements.

It will be apparent from the foregoing that the principles of the present invention may be embodied in many physical forms in addition to those expressly described. Accordingly, to the extent that additional embodiments of the present invention are not expressly excluded from the appended claims, they are fully intended to be covered therein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of fabricating a cutter or the like, comprising the steps of forming a plurality of substantially identical platelike elements, coating said elements with a bonding material, assembling said coated elements in abutting relationship in a stacklike array, treating said assembled elements so as to cause said bonding material to bond said elements into a unitary body, and providing said body with at least one cutting edge, wherein said platelike elements are provided with co-operating bosses and apertures so located that, with each element rotated relative to the preceding element by an angle differing from 180° by a specified angle of index, a boss of one element will be engaged in an aperture of the other to angularly index and locate the one element relative to the other and wherein each element is rotated relative to the preceding element through an angle as aforesaid as it is assembled thereto to effect the aforesaid engagement of the co-operating apertures and bosses with which said elements are provided, thereby angularly indexing each of said elements relative to the elements thereadjacent and maintaining said elements in said indexed relationship.

2. The method of claim 1, wherein said cutting edge is provided by forming a seat for a member having a cutting edge thereon substantially the length of and in a peripheral portion of said body and subsequently seating said member in said seat and bonding it to said body.

3. The method of claim 1, wherein said platelike elements are each provided with two bosses protruding from the element, said bosses being located at different distances from the center of the element and on opposite sides of said center, and two apertures, there being one aperture the same distance from the center of the element as each of said bosses and the angle between each boss and the aperture located at the same distance from the center of the element differing from 180° by the angle of index whereby, with each element rotated relative to the preceding element by an angle differing from 180° by the angle of index and the elements in abutting, side-by-side relationship, the bosses of one of said elements will be engaged in the apertures of the other element, and whereby said bosses will not engage in said apertures if the angle through which the one element is rotated relative to the other differs from the aforesaid angle.

4. The method of claim 1, wherein said platelike elements are each provided with two boss-aperture combinations, said boss-aperture combinations being on opposite sides of the center of the element with the apertures and the bosses facing each other, the angle between each aperture and the oppositely disposed boss differing from 180° by the angle of index, each aperture being the same distance from the center of the element as the oppositely located boss, and the two apertures being at different distances from the center of the element whereby, with each element in the laminate rotated relative to the preceding element by an angle differing from 180° by the angle of index and the elements in abutting side-by-side relationship, the bosses of one of said elements will be engaged in the apertures of the other element and whereby said bosses will not engage in said apertures if the angle through which the one element is rotated relative to the other element differs from the aforesaid angle.

References Cited
UNITED STATES PATENTS

| | | | |
|---|---|---|---|
| 1,571,559 | 2/1926 | Smith | 76—101 A |
| 2,431,581 | 11/1947 | Owen et al. | 76—101 A |
| 2,782,489 | 2/1957 | Hargrove et al. | 76—101 A |

BERNARD STICKNEY, Primary Examiner

UNITED STATES PATENT OFFICE
CERTIFICATE OF CORRECTION

Patent No. 3,613,485   Dated October 19, 1971

Inventor(s) H. K. Kelly et al

It is certified that error appears in the above-identified patent and that said Letters Patent are hereby corrected as shown below:

Column 1, line 39, change "on" to --or--;
, line 60, change "I" to --We--;
Column 3, line 75, change "angle" to --element--;
Column 6, line 23, change "embodiment is" to --embodiments are--.

Signed and sealed this 2nd day of May 1972.

(SEAL)
Attest:

EDWARD M. FLETCHER, JR.
Attesting Officer

ROBERT GOTTSCHALK
Commissioner of Patents